United States Patent
Xiang

(10) Patent No.: US 9,968,137 B2
(45) Date of Patent: May 15, 2018

(54) ELECTRONIC CIGARETTE AND CHARGING METHOD THEREFOR

(71) Applicant: Zhiyong Xiang, Guangdong (CN)

(72) Inventor: Zhiyong Xiang, Guangdong (CN)

( * ) Notice: Subject to any disclaimer, the term of this patent is extended or adjusted under 35 U.S.C. 154(b) by 0 days. days.

(21) Appl. No.: 15/500,690

(22) PCT Filed: Jul. 31, 2014

(86) PCT No.: PCT/CN2014/083449
§ 371 (c)(1),
(2) Date: Jan. 31, 2017

(87) PCT Pub. No.: WO2016/015298
PCT Pub. Date: Feb. 4, 2016

(65) Prior Publication Data
US 2017/0215484 A1    Aug. 3, 2017

(51) Int. Cl.
*A24F 47/00* (2006.01)
*H01M 10/44* (2006.01)
*H02J 7/00* (2006.01)

(52) U.S. Cl.
CPC ........... *A24F 47/008* (2013.01); *H01M 10/44* (2013.01); *H02J 7/0045* (2013.01); *H02J 7/0047* (2013.01);
(Continued)

(58) Field of Classification Search
CPC . A24F 47/008; H01M 10/44; H01M 2220/30; H02J 7/0045; H02J 7/0047; H02J 7/0072
(Continued)

(56) References Cited

U.S. PATENT DOCUMENTS

2014/0014124 A1    1/2014  Glasberg et al.
2015/0047663 A1*   2/2015  Liu ..................... H01M 2/1055
                                                        131/329
(Continued)

FOREIGN PATENT DOCUMENTS

CN          201079011 Y      7/2008
CN          101524187 A      9/2009
(Continued)

OTHER PUBLICATIONS

International Search Report (ISR) issued by the State Intellectual Property Office of the Peoples Republic of China dated Apr. 28, 2015 for PCT/CN2014/083449, China.

*Primary Examiner* — Tulsidas C Patel
*Assistant Examiner* — Travis Chambers
(74) *Attorney, Agent, or Firm* — Tim Tingkang Xia, Esq.; Locke Lord LLP

(57) ABSTRACT

An electronic cigarette (100) and a charging method therefor, comprising an atomizer (110), a charging port (120), a battery (130), an airflow sensing component (140), and a charging component (150). The charging method comprises: when the charging port (120) is connected to an external power source, a first charging current is provided to the battery (130) via the airflow sensing component (140) and a second charging current is provided to the battery via the charging component (150). By charging the battery (130) concurrently with the first charging current and the second charging current, the charging current of the battery (130) is increased, and the charging time of the battery is reduced.

20 Claims, 7 Drawing Sheets

(52) U.S. Cl.
CPC ....... *H02J 7/0072* (2013.01); *H01M 2220/30* (2013.01)

(58) Field of Classification Search
USPC .......................................... 131/328
See application file for complete search history.

(56) References Cited

U.S. PATENT DOCUMENTS

| | | | | |
|---|---|---|---|---|
| 2016/0165951 A1* | 6/2016 | Gupta | ..................... | A24F 1/30 131/329 |
| 2016/0227840 A1* | 8/2016 | Xiang | ................... | A24F 47/008 |

FOREIGN PATENT DOCUMENTS

| | | |
|---|---|---|
| CN | 201352950 Y | 12/2009 |
| CN | 203339772 U | 12/2013 |
| CN | 203660588 U | 6/2014 |
| CN | 203662027 U | 6/2014 |
| EP | 1989946 A1 | 11/2008 |
| EP | 2701268 A1 | 2/2014 |

* cited by examiner

ELECTRONIC CIGARETTE AND CHARGING METHOD THEREFOR

FIELD OF THE INVENTION

The present invention relates to the field of electronic cigarettes, and more particularly to an electronic cigarette and a charging method of the electronic cigarette.

BACKGROUND OF THE INVENTION

A traditional electronic cigarette comprises an atomizer, an airflow sensing component, a heating wire and a battery, the battery supplies power to the airflow sensing component. When a user smokes, the airflow sensing component detects a change of an airflow and outputs a voltage to the heating wire, after the heating wire is heated, smoke oil in the atomizer is atomized, thereby producing smoke for the user to inhale.

For a chargeable electronic cigarette, when it needs to be charged, disassembling the atomizer at a load end, connecting the electronic cigarette with a charger, then charging the battery with a relatively small charging current. Since the charging current is relatively small, a charging time of the battery will be long.

SUMMARY OF THE INVENTION

Aiming at the technical problem of increasing a charging time of a battery of the existing chargeable electronic cigarette results from that the battery only can be charged with a relatively small charging current, the present invention provides an electronic cigarette and a charging method of the electronic cigarette to achieve a technical effect of reducing a charging time of a battery through multi-channel charging current charging for the battery.

The technical solutions adopted by the present invention to solve the technical problem is to provide an electronic cigarette, comprising an atomizer, a charging port and a battery, the electronic cigarette further comprises:

an airflow sensing component configured for receiving an electric energy provided by the battery to detect a change of an airflow when the atomizer is connected to the charging port, and outputting a high level to the atomizer through the charging port to make the atomizer work when detecting the change of the airflow; the airflow sensing component is further configured for providing a first charging current for the battery when the charging port is connected to an external power supply; and a charging component configured for providing a second charging current for the battery when the charging port is connected to the external power supply.

Preferably, the charging component comprises:

a first charging unit configured for providing the second charging current for the battery when the charging port is connected to the external power supply; and a current regulating unit configured for regulating the second charging current.

Preferably, the current regulating unit comprises a first resistor configured for determining a magnitude of the second charging current.

Preferably, the current regulating unit comprises a first variable resistor configured for regulating a magnitude of the second charging current.

Preferably, the first charging unit comprises a first charging integrated circuit, a positive power port of the first charging integrated circuit is connected with a positive electrode of the charging port, and a negative power port of the first charging integrated circuit is connected with a negative electrode of the charging port; a power supply port of the first charging integrated circuit is connected with a positive electrode of the battery, a charging current regulating port of the first charging integrated circuit is connected to the negative electrode of the charging port via the current regulating unit; a negative electrode of the battery is connected with the negative electrode of the charging port.

Preferably, the charging component comprises:

a first voltage detecting unit configured for detecting a voltage of the battery;

a second voltage detecting unit configured for detecting a voltage of the charging port;

multiple second changing units in parallel, each second changing unit is configured for providing a third changing current for the battery when the charging port is connected with the external power supply and receives an actuating instruction, and a total of the third changing current outputted by the each second changing unit is the second charging current; and a first control unit configured for sending the actuating instruction to a corresponding quantity of the second changing units according to a detected voltage of the battery when the second voltage detecting unit detects that the charging port is connected to the external power supply.

Preferably, the second changing unit comprises:

a switching subunit configured for being conducted when receiving the actuating instruction;

a charging subunit configured for providing the third charging current for the battery when the switching subunit is conducted; and a current regulating subunit configured for regulating the third charging current.

Preferably, the charging subunit comprises a second charging integrated circuit, a positive power port of the second charging integrated circuit is connected to a positive electrode of the charging port via the switching subunit, a negative power port of the second charging integrated circuit is connected with a negative electrode of the charging port, a charging current regulating port of the second charging integrated circuit is connected to ground via the current regulating subunit, a power supply port of the second charging integrated circuit is connected with a positive electrode of the battery; a negative electrode of the battery is connected to ground.

Preferably, the switching subunit comprises a MOSFET, a grid of the MOSFET is connected with the first control unit to receive the actuating instruction, a source of the MOSFET is connected with the positive electrode of the charging port, a drain of the MOSFET is connected with the positive power port of the second charging integrated circuit.

Preferably, the current regulating subunit comprises a second resistor configured for determining a magnitude of the third charging current.

Preferably, the current regulating subunit comprises a second variable resistor configured for regulating a magnitude of the third charging current.

Preferably, the first voltage detecting unit comprises a first divider resistor and a second divider resistor connected in series between a positive electrode and a negative electrode of the battery.

Preferably, the second voltage detecting unit comprises a third divider resistor and a forth divider resistor connected in series between a positive electrode and a negative electrode of the charging port.

Preferably, the first control unit comprises a single chip Micyoco, the single chip Micyoco comprises a first detecting pin, a second detecting pin and multiple output control pins; the first detecting pin is connected between the first divider resistor and the second divider resistor, and the first detecting pin is configured for receiving a detection value of the voltage of the battery; the second detecting pin is connected between the third divider resistor and the forth divider resistor, and the second detecting pin is configured for receiving a detection value of the voltage of the charging port; the output control pins are connected to the second changing units correspondingly, and the output control pins are configured for outputting the actuating instruction to the second changing units.

Preferably, the airflow sensing component comprises an airflow sensor, a LED indicating light set and a second control unit; the airflow sensor is configured for detecting the change of the airflow; the second control unit is configured for lighting the LED indicating light set and outputting the high level to the atomizer through the charging port to make the atomizer work when the airflow sensor detects the change of the airflow; the second control unit is further configured for detecting whether the charging port is connected to the external power supply or not, providing the first charging current for the battery and lighting the LED indicating light set when the charging port is connected to the external power supply.

Preferably, the LED indicating light set is provided on one end of the electronic cigarette; the LED indicating light set is configured for imitating a traditional cigarette burning when being lighten and further configured for indicating a charging state.

The present application further provides a charging method of an electronic cigarette, configured for charging the battery of the electronic cigarette above, the charging method comprises steps as follows:

S1. providing the first charging current for the battery through the airflow sensing component when the charging port is connected to the external power supply;

S2. providing the second charging current for the battery through the charging component when the charging port is connected to the external power supply.

Preferably, the charging component comprises a first charging unit and a current regulating unit, the step S2 comprises substeps as follows:

S21. the first charging unit detects whether the charging port is connected to the external power supply or not, and provides the first charging current for the battery when the charging port is connected to the external power supply;

S22. regulating the second charging current through the current regulating unit.

Preferably, the charging component comprises a first voltage detecting unit, a second voltage detecting unit, multiple second changing units in parallel and a first control unit, the step S2 comprises substeps as follows:

S23. the first voltage detecting unit detects a voltage of the battery and outputs a detection result to the first control unit;

S24. the second voltage detecting unit detects a voltage of the charging port and outputs a detection result to the first control unit;

S25. the first control unit sends an actuating instruction to a corresponding quantity of the second changing units according to the voltage of the battery when the voltage detected by the second voltage detecting unit is greater than a second preset threshold, so as to make the corresponding quantity of the second changing units provide a third charging current for the battery; and the voltage of the battery is detected by the first voltage detecting unit.

Preferably, the second changing unit comprises a switching subunit, a charging subunit and a current regulating subunit, the substep S25 comprises substeps as follows:

S251. the switching subunit is conducted when receiving the actuating instruction to make the charging subunit provide the third charging current for the battery;

S252. regulating the third charging current through the current regulating subunit.

The present invention provides an electronic cigarette and a charging method of the electronic cigarette, which can be achieved the following advantageous effects: a first charging current provided by an airflow sensing component and a second charging current provided by a charging component charge a battery together when the electronic cigarette is connected to an external power supply and charged from the external power supply, thus to achieve a technical effect of increasing a charging current of the battery and reducing a charging time of the battery.

DETAILED DESCRIPTION OF THE PREFERRED EMBODIMENT

To make the technical features, objective and effects of the invention more clearly understood, the invention is to be further described with reference to the accompanying drawings and embodiments.

Figure 1:
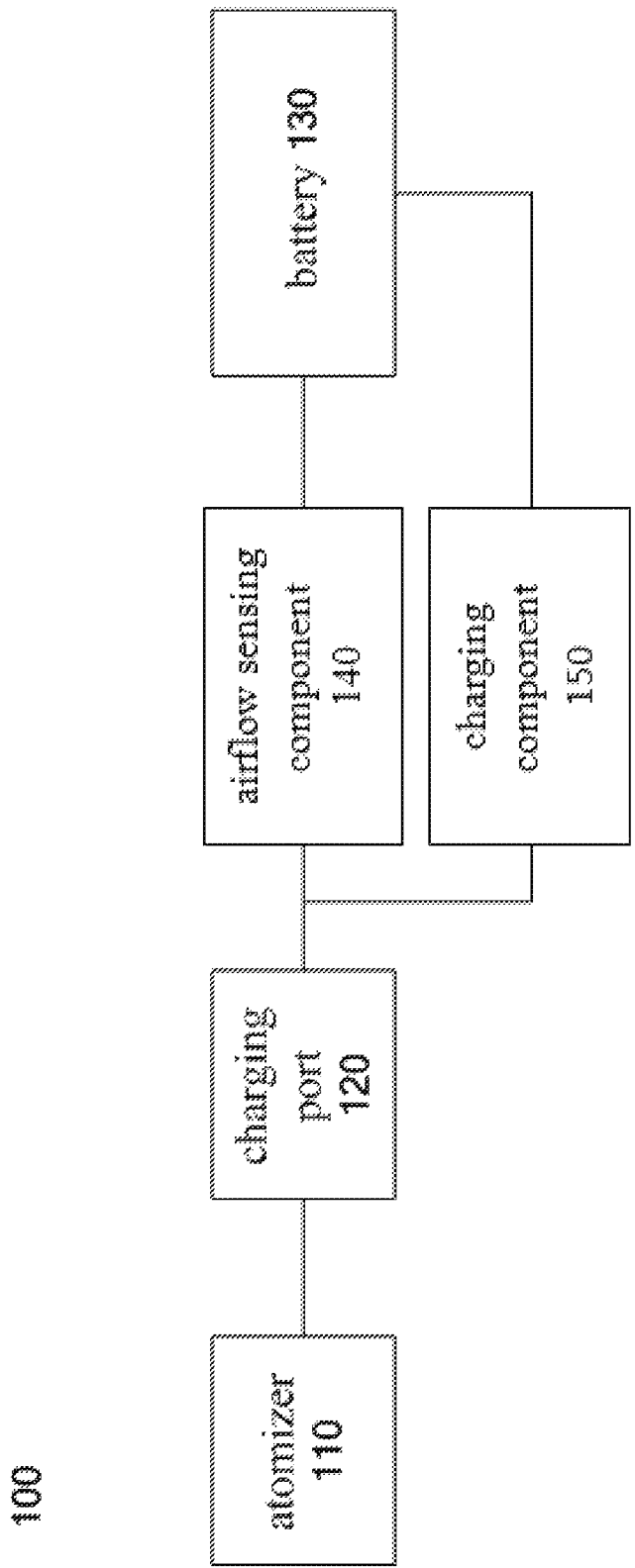
FIG. 1 illustrates a functional block diagram of an electronic cigarette of the present invention.

As shown in the FIG. 1, the present invention provides an electronic cigarette 100, the electronic cigarette 100 comprises an atomizer 110 (a structure of the atomizer is commonly known), a charging port 120, a battery 130, an airflow sensing component 140 and a charging component 150. The atomizer 110 is detachably connected to the charging port 120, the charging port 120 is connected to the battery 130 via the airflow sensing component 140 and the charging component 150 respectively.

when the atomizer 110 is connected to the charging port 120, the electronic cigarette 100 is in an using mode and can be smoked by users. At the moment, the airflow sensing component 140 is powered by the battery 130, and the airflow sensing component 140 is configured for detecting a change of an airflow. When the users smoke through a cigarette holder (not marked in the figure) of the electronic cigarette 100, the airflow sensing component 140 detects the change of the airflow, and outputs a high level to the atomizer 110 through the charging port 120, then a heating wire (shown as L1 in FIG. 4) in the atomizer 110 generates heat, then smoke oil stored in the atomizer 110 is atomized, thereby producing smoke for the users to inhale.

When the atomizer 110 is demounted and the charging port 120 is connected to an external power supply, the electronic cigarette 100 is in a charging state. The airflow sensing component 140 detects a high level at the charging port 120 and provides a first charging current for the battery 130. The charging component 150 detects a high level at the charging port 120 and provides a second charging current for the battery 130. In other words, the airflow sensing component 140 and the charging component 150 charge the battery 130 together, and a charging current of the battery 130 is a sum of the first charging current and the second charging current.

It should be pointed out here that, the electronic cigarette 100 is in the using mode, the airflow sensing component 140 outputs a high level to the atomizer 110 through the charging port 120 when detecting the change of the airflow, the charging component 150 also detects a high level at the charging port 120 at the moment. If it needs to prevent the charging component 150 charging the battery 130 when the electronic cigarette 100 is in the using mode, the charging component 150 needs to compare a value of a detected level with a first preset threshold when detecting the high level at the charging port 120. If the value of the detected level is greater than or equal to the first preset threshold, the charging component 150 will charge the battery 130. The first preset threshold is greater than the high level outputted by the airflow sensing component 140 to the atomizer 110. For example, the high level outputted by the airflow sensing component 140 to the atomizer 110 is 3.5V, and the first preset threshold is 5.0V.

The electronic cigarette 100 provided by the present invention, when being connected to the external power supply, the first charging current provided by the airflow sensing component 140 and the second charging current provided by the charging component 150 charge the battery 130 together, so as to achieve a technical effect of increasing the charging current of the battery 130 and reducing a charging time of the battery 130.

Figure 2:
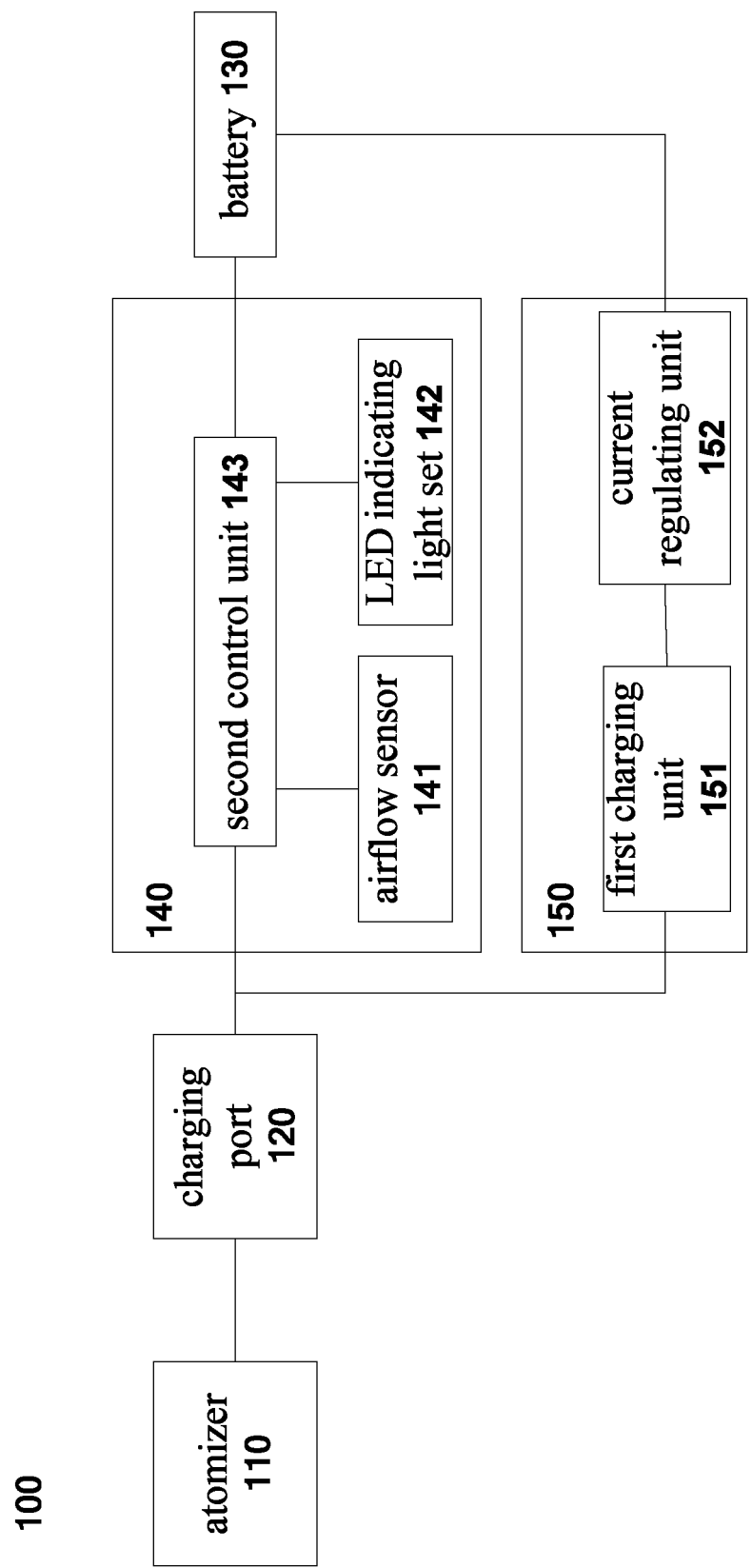
FIG. 2 illustrates a functional block diagram of the electronic cigarette in accordance with a first preferred embodiment of the present invention.

FIG. 2 illustrates a functional block diagram of the electronic cigarette 100 in accordance with a first preferred embodiment of the present invention. As shown in the FIG. 2, in the embodiment, the electronic cigarette 100 comprises an atomizer 110, a charging port 120, a battery 130, an airflow sensing component 140 and a charging component 150. The atomizer 110 is detachably connected to the charging port 120, the charging port 120 is connected with the battery 130 via the airflow sensing component 140 and the charging component 150 respectively.

In the embodiment, the airflow sensing component 140 comprises an airflow sensor 141, a LED indicating light set 142 and a second control unit 143. The second control unit 143 is connected with the charging port 120, the battery 130, the airflow sensor 141 and the LED indicating light set 142 respectively, and the second control unit 143 is provided on one end of the electronic cigarette 100. When the electronic cigarette 100 is in an using mode, the second control unit 143 is powered by the battery 130 and detects a change of an airflow through the airflow sensor 141, and the second control unit 143 further outputs a high level to the atomizer 110 through the charging port 120 to make the atomizer 110 work when the airflow sensor 141 detects the change of the airflow. In the meantime, the second control unit 143 powers the LED indicating light set 142 to light the LED indicating light set 142, so as to achieve a technical effect of indicating smoking and imitating a traditional cigarette burning. Furthermore, the second control unit 143 is further configured for detecting a voltage at the charging port 120, and outputting a first charging current to the battery 130 to charge the battery 130 when detecting a high level (the charging port 120 is connected to an external power supply). At the moment, the second control unit 143 powers the LED indicating light set 142 to light the LED indicating light set 142, so as to achieve a technical effect of indicating being charged. The above configurations make a whole construction of the electronic cigarette be simpler, achieves lower costs, avoids defects of complicated circuits and high costs caused by providing an additional indicating device in the prior arts, and overcomes the above technology biases of those skilled in the art.

In the embodiment, the charging component 150 comprises a first charging unit 151 and a current regulating unit 152. The first charging unit 151 is connected to the charging port 120 and the current regulating unit 152 respectively. The first charging unit 151 is configured for detecting the voltage at the charging port 120, and outputting a second charging current when a detected voltage is greater than a first preset threshold. The current regulating unit 152 is also connected to the battery 130, and the current regulating unit 152 is configured for regulating a magnitude of the second charging current.

Figure 3:
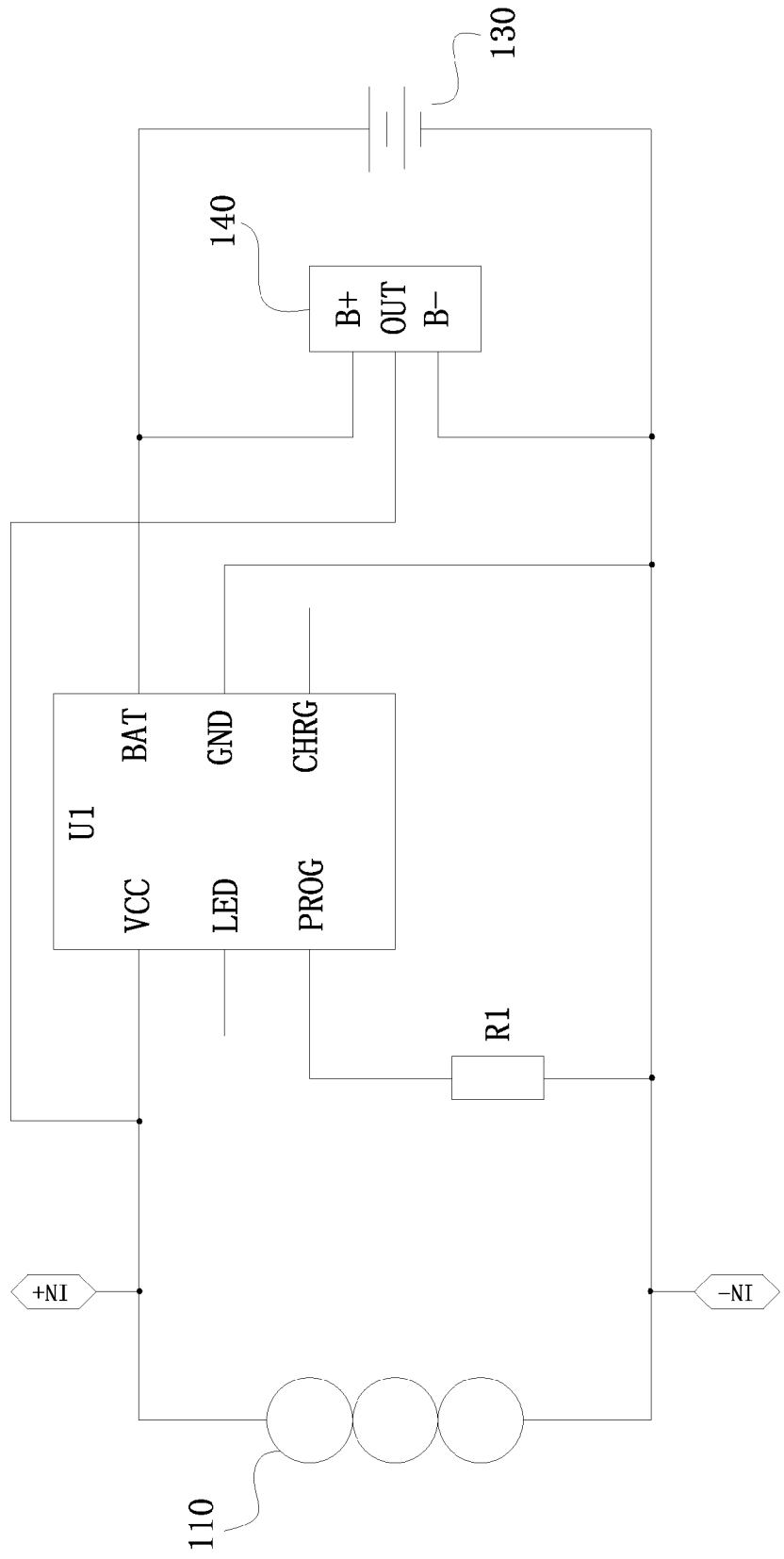
FIG. 3 illustrates a schematic circuit diagram of the electronic cigarette in accordance with the first preferred embodiment of the present invention.

FIG. 3 illustrates a schematic circuit diagram of the electronic cigarette 100 in accordance with the first preferred embodiment of the present invention. Combined with FIG. 2 and FIG. 3, in the embodiment, the airflow sensing component 140 comprises a positive power port B+, a negative power port B− and an output control port OUT. A model of the airflow sensing component 140 is S085 or CT811ZM. The first charging unit 151 comprises a first charging integrated circuit U1. A model of the first charging integrated circuit U1 is JW1057 or VA7204. The current regulating unit 152 comprises a first resistor R1. The atomizer 110 is connected between a positive electrode IN+ and a negative electrode IN− of the charging port 120. A positive power port VCC of the first charging integrated circuit U1 is connected to the positive electrode IN+ of the charging port 120, a negative power port GND of the first charging integrated circuit U1 is connected to the negative electrode IN− of the charging port 120, a charging current regulating port PROG of the first charging integrated circuit U1 is connected to the negative electrode IN− of the charging port 120 via a first resistor R1, a power supply port BAT of the first charging integrated circuit U1 is connected to a positive electrode of the battery 130. The positive power port B+ of the airflow sensing component 140 is connected with the positive electrode of the battery 130, the negative power supply port B− of the airflow sensing component 140 is connected to a negative electrode of the battery 130, and the output control port OUT of the airflow sensing component 140 is connected to the positive electrode IN+ of the charging port 120.

When the atomizer 110 is connected to the charging port 120, the airflow sensing component 140 is powered by the battery 130. The airflow sensing component 140 outputs a high level to the atomizer 110 from the output control port OUT to make the atomizer 110 work when detecting the change of the airflow. At the moment, a voltage of the positive power port VCC of the first charging integrated circuit U1 is not greater than the first preset threshold, thus the first charging integrated circuit U1 does not work. When the atomizer 110 is demounted and the charging port 120 is connected to the external power supply, the voltage of the positive power port VCC of the first charging integrated circuit U1 is greater than the first preset threshold. The first charging integrated circuit U1 outputs the second charging current to the battery 130 through the power supply port BAT, and a magnitude of the second charging current is related to a value of the first resistor R1. Meanwhile, the airflow sensing component 140 detects a high level at the output control port OUT, and outputs the first charging current to the battery 130 through the positive power port B+ and the negative power port B−. A charging current of the battery 130 is a sum of the first charging current and the second charging current.

In other embodiments, the current regulating unit 152 also can be implemented through a variable resistor. At the moment, an adjustable hardware switch can be provided on a shell of the electronic cigarette 100. A value of the variable resistor can be changed by toggling the hardware switch, thus the magnitude of the second charging current is changed. Furthermore, the hardware switch can be provided with multiple tap positions, and different tap positions correspond to different resistances. Users can choose among the multiple tap positions by toggling the hardware switch, so as to guarantee security of the electronic cigarette 100 effectively and regulate effectiveness of the second charging current.

Figure 4:
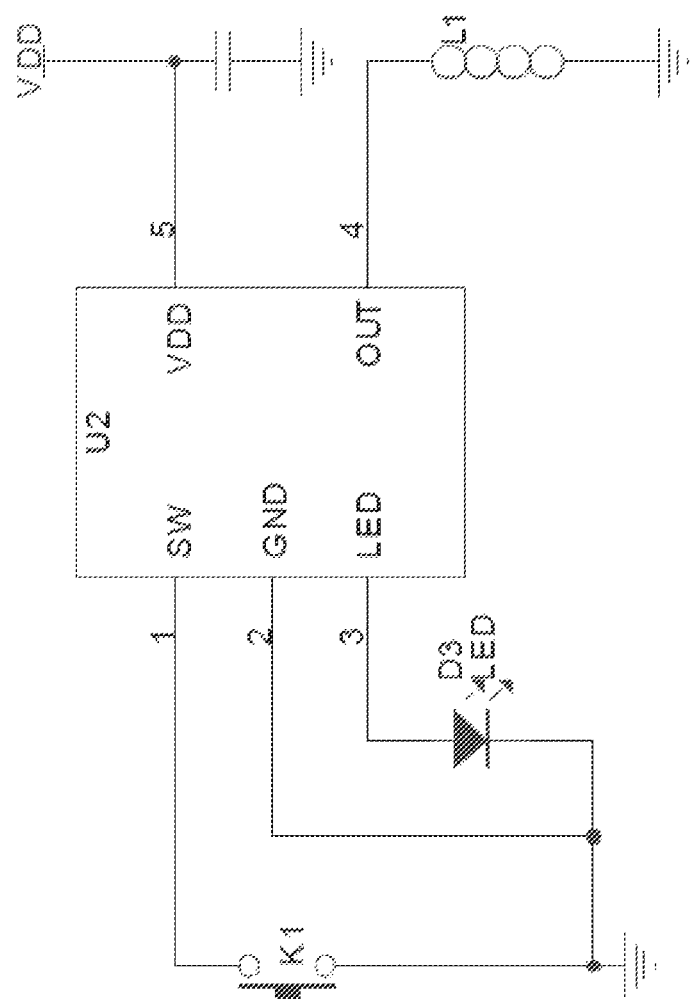
FIG. 4 illustrates a schematic circuit diagram of an airflow sensing component in accordance with the first preferred embodiment of the present invention.

FIG. 4 illustrates a schematic circuit diagram of an airflow sensing component 140 in accordance with the first preferred embodiment of the present invention. As shown in the FIG. 4, in the embodiment, the airflow sensor 141 equivalents to a switch K1 in the circuit. When the airflow sensor 141 detects the change of the airflow, the switch K1 is closed. The LED indicating light set 142 comprises a LED light D3. The second control unit 143 is implemented through a chip U2, and a model of the chip U2 is CT811Z. A switching signal input port SW of the chip U2 is connected to ground via the switch K1, an indicator light control port LED of the chip U2 is connected to a positive electrode of the LED light D3, and a negative electrode of the LED light D3 is connected to the ground. A positive power port VDD of the chip U2 (that is the positive power port B+ of the airflow sensing component 140) is connected to the positive electrode of the battery 130, a negative power port GND of the chip U2 (that is the negative power supply port B− of the airflow sensing component 140) is connected to the ground. An output control port OUT of the chip U2 is connected to a heating wire L1 in the atomizer110 through the positive electrode IN+ of the charging port 120.

In the first preferred embodiment of the electronic cigarette 100 of the present invention, the voltage at the charging port 120 is detected through the second control unit 143, and the first charging current for the battery 130 is provided when the high level (the charging port 120 is connected to the external power supply) is detected. The voltage at the charging port 120 is detected through the first charging unit 151, and the second charging current for the battery 130 is provided when the detected voltage is greater than the first preset threshold. The embodiment can achieve a technical effect of increasing the charging current of the battery 130 and reducing a charging time of the battery 130.

Figure 5:
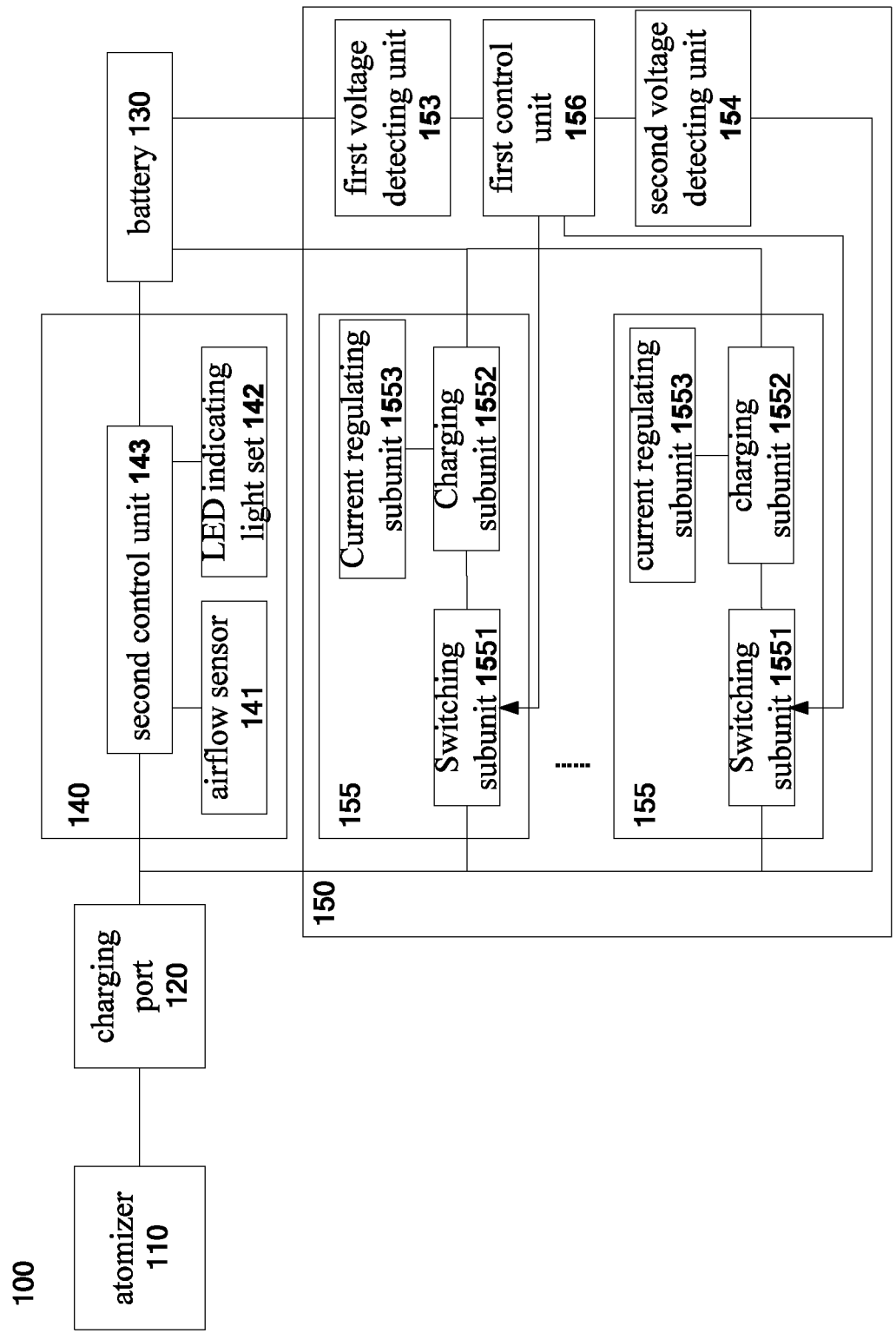
FIG. 5 illustrates a functional block diagram of the electronic cigarette in accordance with a second preferred embodiment of the present invention.

FIG. 5 illustrates a functional block diagram of the electronic cigarette 100 in accordance with a second preferred embodiment of the present invention. As shown in the FIG. 5, in the embodiment, the electronic cigarette 100 comprises an atomizer 110, a charging port 120, a battery 130, an airflow sensing component 140 and a charging component 150. The atomizer 110 is detachably connected with the charging port 120, the charging port 120 is connected to the battery 130 via the airflow sensing component 140 and the charging component 150 respectively.

Differences between the second preferred embodiment and the first preferred embodiment are that, in the second preferred embodiment, the charging component 150 comprises a first voltage detecting unit 153, a second voltage detecting unit 154, multiple second changing units 155 in parallel and a first control unit 156. The first voltage detecting unit 153 is configured for detecting a voltage of the battery 130. The second voltage detecting unit 154 is configured for detecting a voltage at the charging port 120. Each second changing unit 155 is configured for providing a third changing current for the battery 130 when the charging port 120 is connected to an external power supply and receives an actuating instruction. A total of the third changing current outputted by the each second changing unit 155 is a second changing current. The first control unit 156 is configured for sending the actuating instruction to corresponding quantity of the second changing units 155 according to the voltage of the battery 130 detected by the first voltage detecting unit 153, when the second voltage detecting unit 154 detects that the voltage of the the charging port 120 is greater than or equal to a second preset threshold, and the detected.

In the embodiment, the second changing unit 155 comprises a switching subunit 1551, a charging subunit 1552 and a current regulating subunit 1553. The switching subunit 1551 is configured for being conducted when receiving the actuating instruction sent by the first control unit 156. The charging subunit 1552 is configured for providing the third charging current for the battery 130 when the switching subunit 1551 is conducted. The current regulating subunit 1553 is configured for regulating the third charging current.

Figure 6:
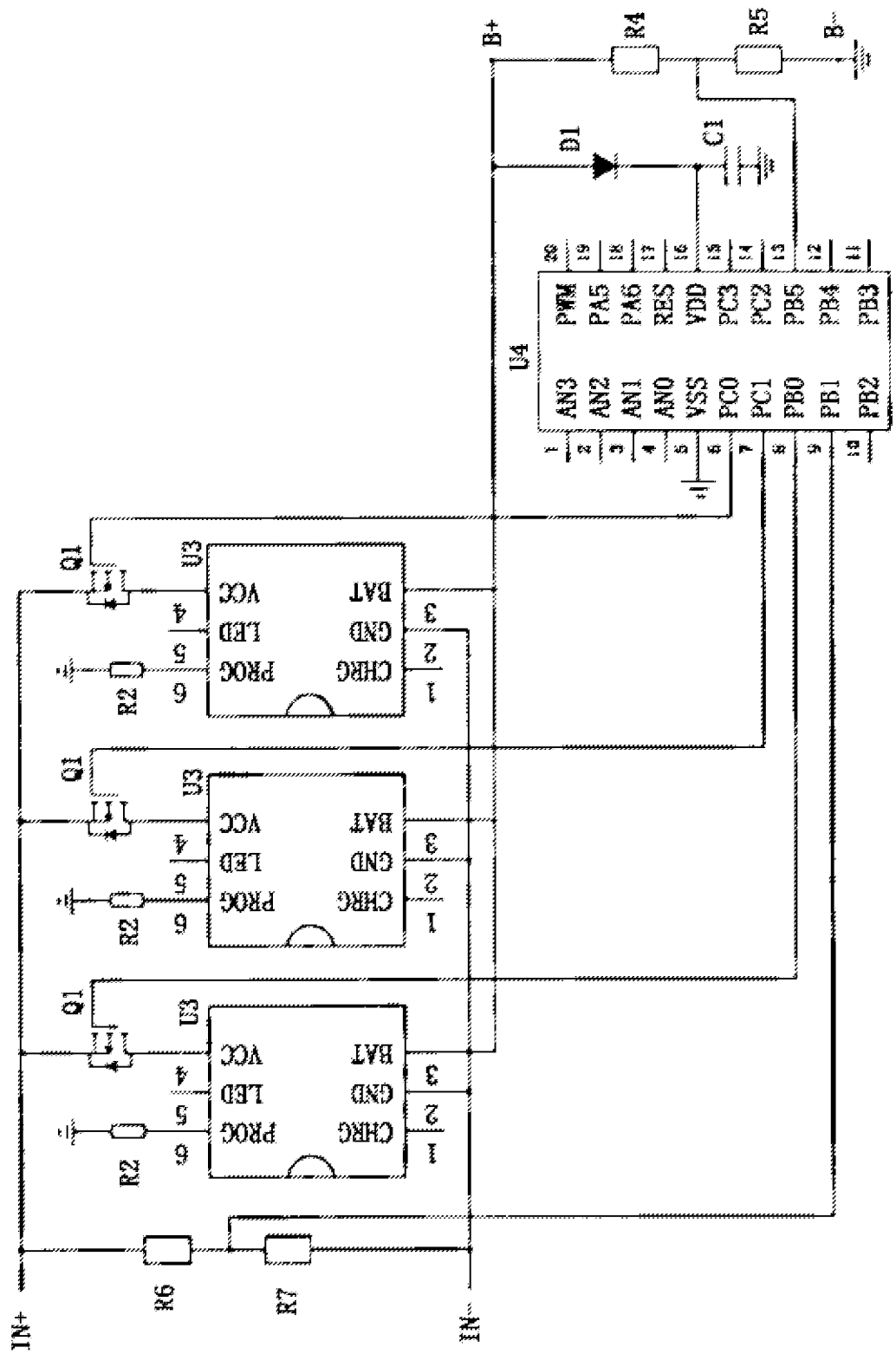
FIG. 6 illustrates a schematic circuit diagram of a charging component in accordance with a preferred embodiment of the present invention.

As shown in FIG. 6, in the embodiment, take three second changing units 155 in parallel (a quantity of the second changing units 155 in parallel in the present invention is not limited) for example. The first voltage detecting unit 153 comprises a first divider resistor R4 and a second divider resistor R5 connected in series between a positive electrode and a negative electrode of the battery 130. The second voltage detecting unit 154 comprises a third divider resistor R6 and a forth divider resistor R7 connected in series between a positive electrode and a negative electrode of the charging port 120. The switching subunit 1551 comprises a MOSFET Q1. The charging subunit 1552 comprises a second charging integrated circuit U3. The current regulating subunit 1553 comprises a second resistor R2. In other embodiments, a resistance value in the current regulating subunit 1553 of each subcircuit can be unequal, and the current regulating subunit 1553 can comprise a second variable resistor. In the embodiment, the first control unit 156 comprises a single chip Micyoco U4, and a model of the single chip Micyoco U4 is HT46R064 or SN8P2712. A positive power port VCC of the second charging integrated circuit U3 is connected to a drain of the MOSFET Q1, A negative power port VCC of the second charging integrated circuit U3 is connected to a negative electrode IN− of the charging port 120, a charging current regulating port PROG of the second charging integrated circuit U3 is connected to ground via the second resistor R2, and a power supply port BAT of the second charging integrated circuit U3 is connected to a positive electrode of the battery 130. A source of the MOSFET Q1 is connected to a positive electrode IN+ of the charging port 120, a grid of the MOSFET Q1 is connected to an output control pin PB0 (PC0 and PC1 are also output control pins) of the single chip Micyoco U4. Connectivity of other subcircuits in parallel is in a similar fashion. A first detecting pin PB5 of the single chip Micyoco U4 is connected between the first divider resistor R4 and the second divider resistor R5, and a second detecting pin PB1 is connected between the third divider resistor R6 and the forth divider resistor R7.

When the charging port 120 is connected to the external power supply, the single chip Micyoco U4 detects a high level that is greater than or equal to the second preset threshold through the second detecting pin PB1, the single chip Micyoco U4 receives a battery voltage through the first detecting pin PB5, and controls a corresponding quantity of MOSFETs Q1 to be conducted. At the moment, the second charging integrated circuits U3 of multiple conducted subcircuits output third charging currents to the battery 130 through their own power supply ports BAT respectively. The single chip Micyoco U4 can finish corresponding judgment and control work through programs recorded, for example, the single chip Micyoco U4 prestores a corresponding relation table, and corresponding relationships between voltage ranges of a battery and quantities of necessary conducted subcircuits are recorded in the corresponding relation table. The single chip Micyoco U4 searches the corresponding relation table to obtain a quantity of necessary conducted subcircuits, then outputs the actuating instruction (a voltage signal) to control the MOSFETs Q1 to be conducted through corresponding output control pins.

The single chip Micyoco U4 can control a corresponding quantity of the MOSFETs Q1 to be conducted and maintain the quantity of the conducted MOSFETs Q1 unchanged in a process of charging only when a voltage detected by the second detecting pin PB1 changes from being lower than the second preset threshold to be greater than or equal to the second preset threshold. The process continues until the charging is completed. After the charging is completed, while the quantity of the corresponding conducted subcircuits corresponding to a voltage detected at the first detecting pin PB3 of the single chip Micyoco U4 in the corresponding relation table is 0, the single chip Micyoco U4 stops outputting the actuating instruction and turns off all the MOSFETs Q1. Alternatively, the single chip Micyoco U4 changes the quantity of the conducted MOSFETs Q1 correspondingly according to the voltage detected at a first detecting pin PB3 in the process of the charging.

Configurations and connection ships of the airflow sensing component 140 in this embodiment are same as those in the first preferred embodiment.

In the second preferred embodiment of the electronic cigarette 100 of the present invention, the voltage at the charging port 120 is detected through the second voltage detecting unit 154, the actuating instruction is sent to the corresponding quantity of the second changing units 155 according to the voltage of the battery 130 detected by the first voltage detecting unit 153 when the detected voltage is greater than or equal to the second preset threshold, so as to make the corresponding quantity of the second changing units 155 provide a third changing current for the battery 130. The embodiment can make the corresponding quantity of the second changing units 155 work to charge the battery 130 according to a remaining capacity of the battery 130, thus to guarantee security of the battery 130 and reduce the charging time of the battery 130.

Figure 7:
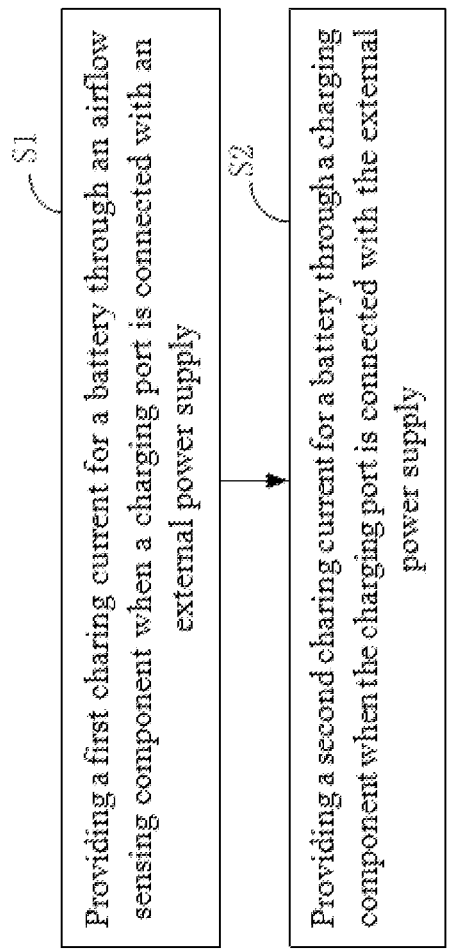
FIG. 7 illustrates a flowchart of a charging method of the electronic cigarette in accordance with a first preferred embodiment of the present invention.

FIG. 7 illustrates a flowchart of a charging method of the electronic cigarette in accordance with a first preferred embodiment of the present invention. As shown in the FIG. 7, in the embodiment, the charging method includes steps as follows:

S1. providing a first charging current for a battery 130 through an airflow sensing component 140 when a charging port 120 is connected with an external power supply;

S2. providing a second charging current for the battery 130 through a charging component 150 when the charging port 120 is connected with the external power supply.

As shown in the FIG. 2, the airflow sensing component 140 comprises an airflow sensor 141, a LED indicating light set 142 and a second control unit 143. The second control unit 143 is connected with the charging port 120, the battery 130, the airflow sensor 141 and the LED indicating light set 142 respectively. The LED indicating light set 142 is provided on one end of the electronic cigarette 100.

In the step S1 of the embodiment, the second control unit 143 detects a voltage at the charging port 120, and concludes that the charging port 120 is connected to the external power supply when detecting a high level. At the moment, the second control unit 143 outputs the first charging current to the battery 130 and charges the battery 130. Meanwhile, the second control unit 143 powers the LED indicating light set 142 to light the LED indicating light set 142, so as to achieve a technical effect of indicating being charged. The above configurations make a whole construction of the electronic cigarette be simpler, achieves lower costs, avoids defects of complicated circuit and high cost caused by providing an additional indicating device in the prior arts, and overcomes the above technology biases of those skilled in the art.

As shown in the FIG. 2, the charging component 150 comprises a first charging unit 151 and a current regulating unit 152. The first charging unit 151 is connected to the charging port 120 and the current regulating unit 152 respectively. The current regulating unit 152 is also connected to the battery 130.

The step S2 of the embodiment comprises substeps as follows: S21. the first charging unit 151 detects whether the charging port 120 is connected to the external power supply or not, and provides the first charging current for the battery 130 when the charging port 120 is connected to the external power supply; S22. regulating the second charging current through the current regulating unit 152.

In the sub step S21, the first charging unit 151 detects a voltage at the charging port 120, and concludes that the charging port 120 is connected to the external power supply to provide a second changing current for the battery 130 when detecting the voltage is greater than or equal to a first preset threshold.

In the substep S22, the current regulating unit 152 can be a regulatable resistor, which can regulate the second charging current by changing a resistance value of the regulatable resistor.

In the first preferred embodiment of the electronic cigarette 100 of the present invention, the voltage at the charging port 120 is detected through the second control unit 143, and the first charging current is provided for the battery 130 when the high level is detected. The voltage at the charging port 120 is detected through the first charging unit 151, and the second charging current is provided for the battery 130 when a detected voltage is greater than the first preset threshold. The embodiment can achieve a technical effect of increasing a charging current of the battery 130 and reducing a charging time of the battery 130.

In the second preferred embodiment of the electronic cigarette 100 of the present invention, as shown in FIG. 5, the charging component 150 comprises a first voltage detecting unit 153, a second voltage detecting unit 154, multiple second changing units 155 in parallel and a first control unit 156. The second changing unit 155 comprises a switching subunit 1551, a charging subunit 1552 and a current regulating subunit 1553.

In the embodiment, the step S2 comprises substeps as follows: S23. the first voltage detecting unit 153 detects a voltage of the battery 130 and outputs a detection result to the control unit 156; S24. the second voltage detecting unit 154 detects a voltage at the charging port 120 and outputs a detection result to the first control unit 156; S25. the first control unit 156 sends an actuating instruction to a corresponding quantity of the second changing units 155 according to the voltage of the battery 130 when the voltage detected by the second voltage detecting unit 154 is greater than a second preset threshold, so as to make the corresponding quantity of the second changing units 155 provide a third changing current for the battery 130.

In the substep S25, the first control unit 156 compares the voltage detected by the second voltage detecting unit 154 with the second preset threshold, and concludes that the charging port 120 is connected to the external power supply if the voltage is greater than or equal to the second preset threshold, at the moment, the first control unit 156 sends the actuating instruction to the corresponding quantity of the second changing units 155 according to the voltage of the battery 130, the voltage of the battery 130 is detected by the first voltage detecting unit 153; the switching subunit 1551 is conducted when receiving the actuating instruction to make the charging subunit 1552 provide the third charging current for the battery 130; the third charging current is regulated through the current regulating subunit 1553.

In the second preferred embodiment of the charging method of the electronic cigarette of the present invention, the voltage at the charging port 120 is detected through the second voltage detecting unit 154, and the actuating instruction is sent to the corresponding quantity of the second changing units 155 according to the detected voltage of the battery 130 when the detected voltage is greater than or equal to the second preset threshold, so as to make the corresponding quantity of the second changing units 155 provide the third changing current for the battery 130. The embodiment can make the corresponding quantity of the second changing units 155 work to charge the battery 130 according to a remaining capacity of the battery 130, thus to guarantee security of the battery 130 and reduce a charging time of the battery 130.

Obviously, those with ordinary skill in the art can make various changes and modification for these embodiments without breaking away from the spirit and protection scope of the present invention. In this case, if these changes and modification for the present invention are within the scope of the claims of the present invention and its equivalent technology, the present invention is also intent to include these changes and modification.

The invention claimed is:

1. An electronic cigarette, comprising an atomizer (110), a charging port (120) and a battery (130), wherein the electronic cigarette further comprises:
    an airflow sensing component (140) configured for receiving an electric energy provided by the battery (130) to detect a change of airflow when the atomizer (110) is connected with the charging port (120), and outputting a high level to the atomizer (110) through the charging port (120) to make the atomizer (110) work when the change of the airflow is detected; the airflow sensing component (140) is further configured for providing a first charging current for the battery (130) when the charging port (120) is connected to an external power supply; and
    a charging component (150) configured for providing a second charging current for the battery (130) when the charging port (120) is connected to the external power supply.

2. The electronic cigarette according to claim 1, wherein the charging component (150) comprises:
    a first charging unit (151) configured for providing the second charging current for the battery (130) when the charging port (120) is connected to the external power supply; and
    a current regulating unit (152) configured for regulating the second charging current.

3. The electronic cigarette according to claim 2, wherein the current regulating unit (152) comprises a first resistor configured for determining a magnitude of the second charging current.

4. The electronic cigarette according to claim 2, wherein the current regulating unit (152) comprises a first variable resistor configured for regulating a magnitude of the second charging current.

5. The electronic cigarette according to claim 2, wherein the first charging unit (151) comprises a first charging integrated circuit (U1), a positive power port of the first charging integrated circuit (U1) is connected with a positive electrode of the charging port (120), and a negative power port of the first charging integrated circuit (U1) is connected with a negative electrode of the charging port (120); a power supply port of the first charging integrated circuit (U1) is connected with a positive electrode of the battery (130), a charging current regulating port of the first charging integrated circuit (U1) is connected to the negative electrode of the charging port (120) via the current regulating unit (152); a negative electrode of the battery (130) is connected with the negative electrode of the charging port (120).

6. The electronic cigarette according to claim 1, wherein the charging component (150) comprises:
    a first voltage detecting unit (153) configured for detecting a voltage of the battery (130);
    a second voltage detecting unit (154) configured for detecting a voltage of the charging port (120);
    multiple second changing units (155) in parallel, each second changing unit (155) is configured for providing a third changing current for the battery (130) when the charging port (120) is connected with the external power supply and receives an actuating instruction, and a total of the third changing current outputted by the each second changing unit (155) is the second charging current; and
    a first control unit (156) configured for sending the actuating instruction to a corresponding quantity of the second changing units (155) according to a detected voltage of the battery (130) when the second voltage detecting unit (154) detects that the charging port (120) is connected to the external power supply.

7. The electronic cigarette according to claim 6, wherein the first voltage detecting unit (153) comprises a first divider resistor (R4) and a second divider resistor (R5) connected in series between a positive electrode and a negative electrode of the battery (130).

8. The electronic cigarette according to claim 6, wherein the second changing unit (155) comprises:
    a switching subunit (1551) configured for being conducted when receiving the actuating instruction;

a charging subunit (1552) configured for providing the third charging current for the battery (130) when the switching subunit (1551) is conducted; and a current regulating subunit (1553) configured for regulating the third charging current.

9. The electronic cigarette according to claim 8, wherein the charging subunit (1552) comprises a second charging integrated circuit (U3), a positive power port of the second charging integrated circuit (U3) is connected to a positive electrode of the charging port (120) via the switching subunit (1551), a negative power port of the second charging integrated circuit (U3) is connected with a negative electrode of the charging port (120), a charging current regulating port of the second charging integrated circuit (U3) is connected to ground via the current regulating subunit (1553), a power supply port of the second charging integrated circuit (U3) is connected with a positive electrode of the battery (130); a negative electrode of the battery (130) is connected to ground.

10. The electronic cigarette according to claim 9, wherein the switching subunit (1551) comprises a MOSFET (Q1), a grid of the MOSFET (Q1) is connected with the first control unit (156) to receive the actuating instruction, a source of the MOSFET (Q1) is connected with the positive electrode of the charging port (120), a drain of the MOSFET (Q1) is connected with the positive power port of the second charging integrated circuit (U3).

11. The electronic cigarette according to claims 9, wherein the current regulating subunit (1553) comprises a second resistor.

12. The electronic cigarette according to claims 9, wherein the current regulating subunit (1553) comprises a second variable resistor.

13. The electronic cigarette according to claim 7, wherein the second voltage detecting unit (154) comprises a third divider resistor (R6) and a forth divider resistor (R7) connected in series between a positive electrode and a negative electrode of the charging port (120).

14. The electronic cigarette according to claim 13, wherein the first control unit (156) comprises a single chip Micyoco (U4), the single chip Micyoco (U4) comprises a first detecting pin, a second detecting pin and multiple output control pins; the first detecting pin is connected between the first divider resistor (R4) and the second divider resistor (R5), and the first detecting pin is configured for receiving a detection value of the voltage of the battery (130); the second detecting pin is connected between the third divider resistor (R6) and the forth divider resistor (R7), and the second detecting pin is configured for receiving a detection value of the voltage of the charging port (120); the output control pins are connected with the second changing units (155) correspondingly, and the output control pins are configured for outputting the actuating instruction to the second changing units (155).

15. The electronic cigarette according to claim 1, wherein the airflow sensing component (140) comprises an airflow sensor (141), a LED indicating light set (142) and a second control unit (143); the airflow sensor (141) is configured for detecting the change of the airflow; the second control unit (143) is configured for lighting the LED indicating light set (142) and outputting the high level to the atomizer (110) through the charging port (120) to make the atomizer (110) work when the airflow sensor (141) detects the change of the airflow; the second control unit (143) is further configured for detecting whether the charging port (120) is connected to the external power supply or not, providing the first charging current for the battery (130) and lighting the LED indicating light set (142) when the charging port (120) is connected to the external power supply.

16. The electronic cigarette according to claim 15, wherein the LED indicating light set (142) is provided on one end of the electronic cigarette; the LED indicating light set (142) is configured for imitating a traditional cigarette burning when being lighten and further configured for indicating a charging state.

17. A charging method of an electronic cigarette, configured for charging the battery (130) of the electronic cigarette of claim 1, wherein the charging method comprises steps as follows:

S1. providing the first charging current for the battery (130) through the airflow sensing component (140) when the charging port (120) is connected to the external power supply;

S2. providing the second charging current for the battery (130) through the charging component (150) when the charging port (120) is connected to the external power supply.

18. The charging method of the electronic cigarette according to claim 17, wherein the charging component (150) comprises a first charging unit (151) and a current regulating unit (152), the step S2 comprises substeps as follows:

S21. the first charging unit (151) detects whether the charging port (120) is connected to the external power supply or not, and provides the first charging current for the battery (130) when the charging port (120) is connected to the external power supply;

S22. regulating the second charging current through the current regulating unit (152).

19. The charging method of the electronic cigarette according to claim 17, wherein the charging component (150) comprises a first voltage detecting unit (153), a second voltage detecting unit (154), multiple second changing units (155) in parallel and a first control unit (156), the step S2 comprises substeps as follows:

S23. the first voltage detecting unit (153) detects a voltage of the battery (130) and outputs a detection result to the first control unit (156);

S24. the second voltage detecting unit (154) detects a voltage of the charging port (120) and outputs a detection result to the first control unit (156);

S25. the first control unit (156) sends an actuating instruction to a corresponding quantity of the second changing units (155) according to the voltage of the battery (130) detected by the first voltage detecting unit (153) when the voltage detected by the second voltage detecting unit (154) is greater than a second preset threshold, so as to make the corresponding quantity of the second changing units (155) provide a third changing current for the battery (130).

20. The charging method of the electronic cigarette according to claim 19, wherein the second changing unit (155) comprises a switching subunit (1551), a charging subunit (1552) and a current regulating subunit (1553), the substep S25 comprises substeps as follows:

S251. the switching subunit (1551) is conducted when receiving the actuating instruction to make the charging subunit (1552) provide the third charging current for the battery (130);

S252. regulating the third charging current through the current regulating subunit (1553).

\* \* \* \* \*